Sept. 11, 1956   F. W. MEREDITH ET AL   2,762,962
SAFETY DEVICE FOR AUTOMATIC PILOT SYSTEM
Filed June 20, 1951
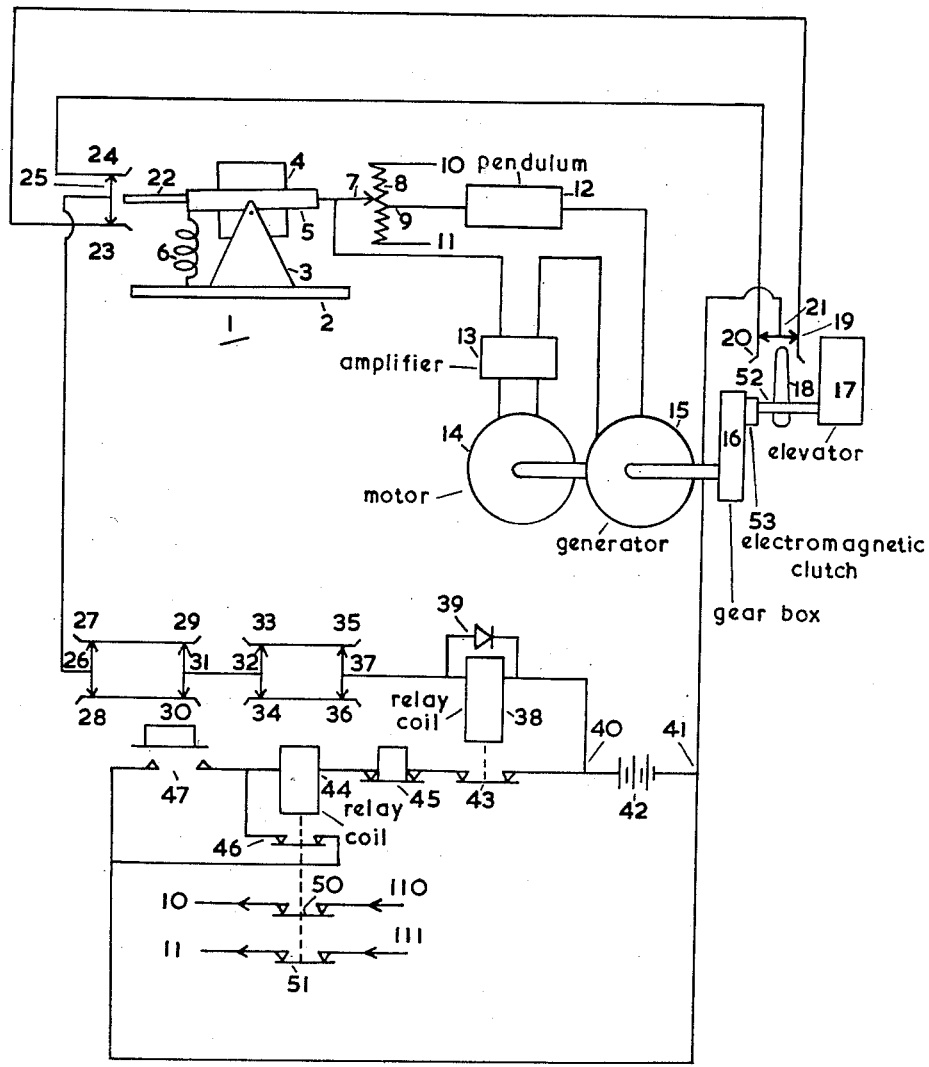
INVENTORS:
F. W. MEREDITH &
D. L. MEREDITH
BY: Moore & Hall
ATTORNEYS.

United States Patent Office 2,762,962
Patented Sept. 11, 1956

2,762,962

SAFETY DEVICE FOR AUTOMATIC PILOT SYSTEM

Frederick William Meredith and Dennis L. Meredith, London, England, assignors to S. Smith and Sons (England) Limited, London, England Application June 20, 1951, Serial No. 232,616

Claims priority, application Great Britain June 21, 1950

11 Claims. (Cl. 318—489)

This invention is concerned with the provision of a safety device for an automatic pilot system, for a dirigible craft. In such a system the craft is controlled about its axes by operation of the control surfaces in accordance with motion about those axes to stabilise the craft. Such a system is for example described in British specification No. 611,037.

It is the object of the present invention to provide a simple overall control of an automatic pilot system whereby the automatic control system is put out of action upon the occurrence of any malfunctioning in the system which would lead to dangerous control surface movement.

According to the present invention we provide a safety device for an automatic pilot system for a dirigible craft wherein a first member is moved between first and second extreme positions in accordance with rate of turn of the craft about a control axis, the first member assuming its first extreme position when the craft has more than a predetermined rate of turn in one direction about the said axis and assuming its second extreme position when the craft has more than a predetermined rate of turn in the opposite direction about the said axis, and a second member is moved to one or other of first and second extreme positions in accordance with persistent motion of the control surface controlling the craft about the control axis in one direction or the other, correct functioning of the system corresponding to the first and second members both occupying their first extreme positions or both occupying their second extreme positions, together with means operative to put the control system out of action when one of the members occupies its first extreme position and the other occupies its second extreme position.

The position of the first member may conveniently be controlled by a spring restrained gyroscope arranged to be responsive to rate of turn of the craft about the control axis. When such a spring-restrained gyroscope is used as part of the automatic control system itself the first member may be controlled by that gyroscope.

The position of the second member may be controlled by a frictional drive from a shaft actuating the control surface.

The first and second members may each be respectively adapted to engage, in their first and second extreme positions, with first and second moving contacts and thus break contact between one or other of said moving contacts and a fixed contact, the first moving contacts being connected together, the second moving contacts being connected together and the first and second fixed contacts being connected in series with a relay adapted when de-energized to break the power supply to the system.

Preferably the above mentioned relay is slugged, so that a momentary break in the circuit does not result in the interruption of the power supply.

An embodiment of the invention, as applied to the automatic pilot system for aircraft disclosed in British specification No. 611,037 will now be described with reference to the accompanying drawing.

As there shown, the movement of an aircraft elevator 17 is controlled by a rate of turn gyroscope 1.

Gyroscope 1 comprises a base 2 upon which is mounted by means of a bracket 3 and gimbal ring 5 a rotor 4. The spin axis of rotor 4 and the axis of pivoting of gimbal ring 5 are at right angles to each other. Movement of ring 5 is restrained by means of a spring 6 attached at one end to the ring 5 and at the other end to the base 2. When the spring is unstressed the plane containing the spin and pivot axes is parallel to the base 2, and in this condition a conducting wiper arm 7 engages with the centre tap of a potentiometer resistor 8. The ends of the resistor are connected to terminals 10, 11 of an A. C. power supply. There is also provided on the gimbal ring 5 an insulated member 22 (constituting the first member according to the invention) which upon deviation of the plane of gimbal ring 5 from the position in which spring 6 is unstressed by more than a predetermined amount engages with one or other of moving contacts 23, 24, causing such contact to move out of engagement with fixed contact 25. Gyroscope 1 is mounted in the aircraft with the pitch axis of the aircraft normal to the base 2. Thus in operation a signal is developed between wiper 7 and a lead 9 connected to the centre tap which is proportional to the rate of pitch of the aircraft, and when the rate of pitch exceeds a predetermined value one or other of moving contacts 23, 24 is moved out of engagement with fixed contact 25.

The rate of pitch signal above referred to controls the elevator 17 by means of the system comprising amplifier 13, servo motor 14, tachometric generator 15, gear box 16 and clutch 53 the control being monitored by a pitch pendulum 12 and the control operating in the manner fully described in British specification No. 611,037 (as is the form of pendulum 12).

An insulated member 18 is carried on the output shaft 52 of gear box 16, and in frictional engagement therewith. Member 18 constitutes the second member according to the invention and engages with one or the other of moving contacts 19, 20 causing such contact to move out of engagement with fixed contact 21. Contacts 19, 20 of course lie in a plane at right angles to shaft 52 but are shown out of such a plane for clarity. Moving contacts 19 and 23 are connected together, as are contacts 20 and 24. The arrangement is such that when the rate of pitch is such as to move contact 23 away from contact 25, appropriate actuation of the elevator to correct the rate of pitch results in movement of contact 19 away from contact 21, so that a connection is maintained between fixed contacts 25 and fixed contact 21.

There are provided for the rudder channel fixed contact 26 and moving contacts 27 and 28 associated with the gear box output shaft and fixed contact 31 and moving contacts 29 and 30 associated with the rate of yaw gyro and corresponding contacts 32, 33, 34, 35, 36, 37 associated with the corresponding components for the aileron channel, these channels being as shown in British specification No. 611,037 and the method of actuating them being obvious from the description with reference to the pitch channel.

Fixed contacts 25 and 26 are connected together, as are fixed contacts 31 and 32. Fixed contact 37 is connected to one terminal of the winding of a relay 38, the other terminal of which is connected to one terminal 40 of a D. C. source, indicated as a battery 42. A dry plate rectifier 39 is connected in parallel with the winding of relay 38 to provide a slugging effect. The other terminal 41 of the source is connected to fixed contact 21.

Contact 43, actuated by relay 38, is connected, in series with a normally closed push-button 45 between terminal 40 and one terminal of the winding of a switching relay 44. The other terminal of relay 44 is connected through the terminals of a normally open push-button 47 to terminal 41, while contact 46, operated by relay 44, is connected in parallel with 47 to provide a holding-on circuit.

Contacts 50, 51, also actuated by relay 44, control the supply of power from input-terminals 110, 111, to the terminals 10, 11 from which the power for the servomotor's pendulums etc. is obtained, and also the energising windings of the clutches.

In operation depression of button 47 energises relay 44, causing power to be supplied to the servo system via terminals 10, 11. So long as the movements of the control surfaces are in directions appropriate to correct the rates of turn detected by the three rate of turn gyroscopes the circuit for the operating coil of relay 38 is complete and contact 43 remains closed. If the movement is incorrect in one channel the circuit of relay 38 will be interrupted and, when the current continuing to flow in the coil 38 and rectifier 39 has sufficiently decayed, contact 43 will be opened, relay 44 de-energised, and the power supply to the system cut off. The slugging of relay 38 ensures that a momentary discrepancy between rate of turn and control surface movement does not result in the interruption of the power supply. Such momentary discrepancy may occur, for example, if the gyro signal is phase-advanced to improve the high frequency response of the system. However, on the occurrence of an elevator servomotor runaway, contact 19, for example, will be moved away from contact 21. The resultant elevator movement will produce a considerable rate of pitch, member 22 will move contact 24 away from contact 25, the resultant break in the circuit of relay 38 will persist, contact 43 will open and the power supply to the system will be cut off. The time-delay introduced by the slugging of relay 38 will clearly have to be such that, on the one hand, the momentary discrepancies referred to earlier do not result in the cut off of the power supply and on the other such that a servomotor runaway produces interruption of the supply before dangerously high control moments are built up by the control surface concerned.

It will be appreciated that any appropriate method of delaying the action of relay 38 may be used—for instance a condenser may be connected in parallel with the winding, or a thermal delay circuit may be interposed.

What we claim is:

1. A safety device for an automatic pilot system for dirigible craft comprising a first member, means to move said first member between a first extreme position, when the craft has more than a predetermined rate of turn in one direction about a control axis, and a second extreme position, when the craft has more than a predetermined rate about said control axis in the other direction, a second member, means moving said second member to one or the other of first and second extreme positions in accordance with persistent motion in one direction or the other of a control surface controlling the craft about said control axis, correct functioning of the system corresponding to the first and second members both occupying their first extreme positions or both occupying their second extreme positions, and means operative to put the pilot system out of action when one of the said first and second members occupies its first extreme position and the other of said members occupies its second extreme position.

2. A device as claimed in claim 1 wherein the first member is actuated by a spring-restrained gyroscope arranged to be responsive to rate of turn of the craft about the control axis.

3. A device as claimed in claim 1 wherein the second member is moved by means of a frictional drive from a shaft actuating the control surface.

4. A safety device for an automatic pilot system for dirigible craft comprising a first member, means moving said first member between first and second extreme positions in accordance with the rate of turn of the said craft about a control axis, first and second moving contacts engaged by said first member in its respective extreme positions, fixed contact means normally contacted by said moving contacts, contact being broken by engagement between the first member and the first or second moving contact, such breaking corresponding to a rate of turn of the craft about the control axis greater than a predetermined amount, a second member, means moving said second member between first and second extreme positions in accordance with persistent motion in one direction or the other of a control surface controlling the craft about said control axis, further first and second moving contacts engaged by said second member in its respective extreme positions, further fixed contact means normally contacted by said further moving contacts, contact being broken by engagement between the second member and the said first or second further moving contact, such breaking corresponding to persistent motion in one direction or the other of the control surface controlling the craft about said control axis, correct functioning of the system corresponding to the first member and the second member engaging with the first moving contact and the further first moving contact or engaging with the second moving contact and the further second moving contact respectively, means connecting said first contact and said first further contact, means connecting said second contact and said second further contact, a relay, a power supply for said relay, said relay and said power supply being connected in series with said fixed contact means and said further fixed contact means and said relay being adapted, on de-energisation, to break the power supply to the said automatic pilot system.

5. A device as claimed in claim 4 comprising also means to delay the operation of the relay, whereby a momentary lack of correspondence between the first and second members does not affect the operation of the system.

6. A device as claimed in claim 5 wherein the first member is moved by a spring-restrained gyroscope arranged to be responsive to rate of turn of the craft about the control axis.

7. A device as claimed in claim 6 wherein the second member is moved by means of a frictional drive from a shaft actuating the control surface.

8. A device as claimed in claim 7 comprising a dry plate rectifier connected in parallel with the winding of the relay to delay its action.

9. A safety device for an automatic pilot system for a dirigible craft, said safety device serving to deactivate a control system upon the occurrence of discrepancies between disturbances in the motion of the craft and motion of the appropriate control surface normally utilized to correct the said disturbances, comprising a first member, means to move said first member between first and second extreme positions in accordance with rate of turn of the craft about a control axis, the said first member assuming a first extreme position when the craft has more than a predetermined rate of turn in one direction about the said axis and assuming a second extreme position when the craft has more than a predetermined rate of turn in the opposite direction about said axis, a second member, means to move said second member to one or the other of first and second extreme positions in accordance with persistent motion in one direction or the other of the control surface controlling the craft about the said control axis, correct functioning of the system corresponding to the first and second members both occupying their first extreme positions, or both occupying their second extreme positions or at least one of the members occupying an intermediate position, comparison means, independent of the control system itself, to compare the positions of said first and second members, and means operated by said comparison means to deactivate the pilot system when one of the members occupies its first extreme position and the other occupies its second extreme position.

10. A device as claimed in claim 9 wherein the said comparison means comprises, in association with each of the said first and second members, first and second moving contacts normally engaging with a fixed contact, contact being broken when either the first or second member is in its respective extreme position, the said first moving contacts being connected together, the said second moving contacts being connected together, and a relay adapted when de-energized to break a power supply to the said automatic pilot system, said relay being connected with its operating coil in series with the said fixed contacts.

11. A device as claimed in claim 10 wherein the said relay includes means delaying the operation thereof, whereby a momentary discrepancy between the positions of the first and second members does not affect the operation of the system.

References Cited in the file of this patent

UNITED STATES PATENTS

| | | |
|---|---|---|
| 2,376,513 | Shaffer | May 22, 1945 |
| 2,403,658 | Hayman | July 9, 1946 |
| 2,415,430 | Frische et al. | Feb. 11, 1947 |
| 2,470,820 | Hull | May 24, 1949 |
| 2,476,844 | Davis et al. | July 19, 1949 |
| 2,480,574 | Hanna et al. | Aug. 30, 1949 |
| 2,487,793 | Esval et al. | Nov. 15, 1949 |
| 2,492,745 | Hammes | Dec. 27, 1949 |